US 6,729,887 B2

(12) United States Patent
Katsumata et al.

(10) Patent No.: US 6,729,887 B2
(45) Date of Patent: May 4, 2004

(54) STRUCTURE OF INSTALLATION

(75) Inventors: Makoto Katsumata, Shizuoka (JP); Tatsuya Kato, Shizuoka (JP); Atsushi Kagawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/329,032

(22) Filed: Dec. 26, 2002

(65) Prior Publication Data

US 2003/0124884 A1 Jul. 3, 2003

(30) Foreign Application Priority Data

Dec. 28, 2001 (JP) ........................................ 2001-400276

(51) Int. Cl.⁷ ............................................... H01R 11/30
(52) U.S. Cl. ......................................... 439/39; 439/527
(58) Field of Search ............................. 439/76, 2, 39, 439/34, 527

(56) References Cited

U.S. PATENT DOCUMENTS

| 4,058,357 A | 11/1977 | Wallace | 339/12 R |
| 4,820,978 A * | 4/1989 | Hirota | 324/166 |
| 5,392,350 A * | 2/1995 | Swanson | 379/446 |
| 5,732,966 A * | 3/1998 | Menard et al. | 280/422 |

FOREIGN PATENT DOCUMENTS

| FR | 2 749 236 | 12/1997 |
| GB | 2 331 403 A | 5/1999 |
| WO | 99/49584 | 9/1999 |

* cited by examiner

Primary Examiner—Dean A. Reichard
Assistant Examiner—Jinhee Lee
(74) Attorney, Agent, or Firm—Armstrong, Kratz, Quintos, Hanson & Brooks, LLP

(57) ABSTRACT

In an installation structure, mounting/dismounting a device on a body panel can be done easily and the device can be fixed securely and recyclability is improved. Providing a mounting portion (27) on an automotive component (10), a supporting portion (51) on the body of a motor vehicle (50), a magnet (45) on either one of the mounting portion (27) or supporting portion (51), and making the other of the mounting portion (27) or supporting portion (51) with a ferromagnetic material, the mounting portion (27) and the supporting portion (51) are fixed attractively by magnetic force. The mounting portion (27) is provided with a slide portion (29) and the supporting portion (51) is provided with a guide portion (53) engaging slidingly with the slide portion (29).

10 Claims, 5 Drawing Sheets

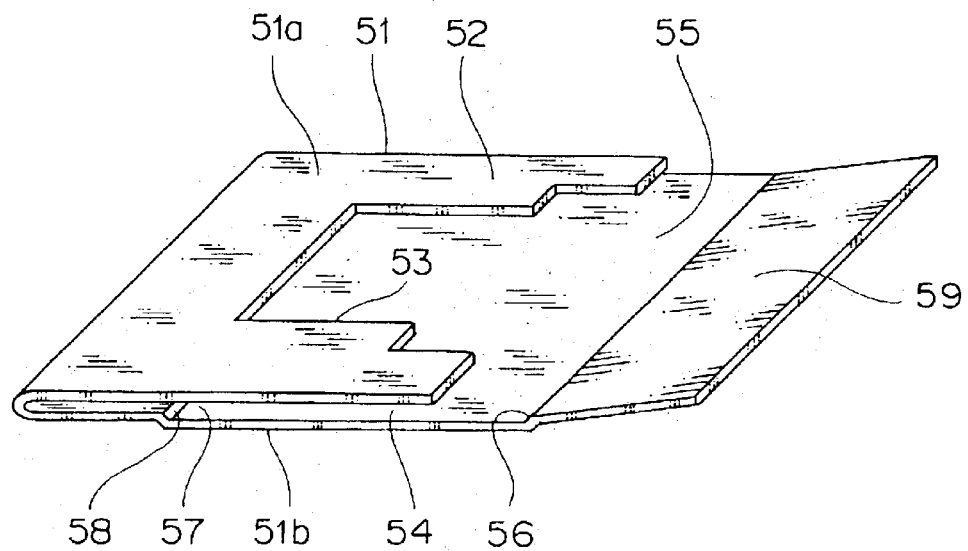
F I G. 6

STRUCTURE OF INSTALLATION

BACKGROUND OF THE INVENTION

1. Field of the Invention

This invention relates to a structure of installation for installing an automotive component used for a wire harness, such as an electric connecting box or a protector, on a body panel of a motor vehicle or other vehicle.

2. Description of the Related Art

FIG. 8 shows an example of the related art corresponding to this type of a structure of installation.

An electric connecting box 80, as shown in FIG. 8, includes a main body 81, a cover 85 for covering an opening of the main body 81 and a not-shown junction block being received in the main body 81. The junction block has functional components, such as a relay, a fuse and a connector, and a bus bar being laminated on an insulating baseboard.

A locking portion 82 is provided on the main body 81 and an engaging portion 86 for engaging with the locking portion 82 is provided on a cover 85. The main body 81 and the cover 85 are fitted closely by means of engaging the locking portion 82 with the engaging portion 86 to prevent water from penetrating into the electric connecting box for protecting functional components when the electric connection box is splashed with water.

L-shape or inverted L-shape mounting brackets 83 are provided at both side walls of the main body 81, and a mounting portion 84 having a bolt inserting opening 84a is formed at a flat portion of a front end of the mounting bracket 83. The bolt insertion opening 84a is not threaded but is formed into a so-called unloaded hole. When displacement of position exists between the main body 81 and the body of motor vehicle, the displacement of position can be absorbed in order to form the bolt insertion opening 84a into an unloaded hole.

Nuts 88 are welded at predetermined positions on a body panel 87 of a not-shown body of motor vehicle. The mounting portions 84 of the main body 81 are placed correspondingly to the nuts 88. Usually, the electric connecting boxes 80 are fixed at an engine room and at the body panel 87 surrounding an instrument panel in a motor vehicle.

For mounting the electric connecting box 80 on the body panel 87, the electric connecting box 80 can be fixed on the body of motor vehicle by means of positioning holes 88a of the nuts 88 on the body panel 87 and the bolt insertion openings 84a of the mounting portions 84 to be coaxial, inserting clamping bolts 89 into the bolt insertion openings 84a, and tightening the clamping bolts 89.

For dismounting the electric connecting box 80 from the body of motor vehicle, the electric connecting box 80 can be easily removed from the body of motor vehicle by means of removing clamping bolts 89 from nuts 88, doing an operation by inverse process against mounting operation mentioned above.

Objects to be Solved

Usual structure of installation by prior art mentioned above has following drawback to be solved.

Operation of mounting and dismounting the electric connection box is inefficient. Many electronic devices and functional components are located at the vicinity of an engine room and an instrument panel of a motor vehicle where the electric connecting boxes are mounted, and many electric wires are placed at the same area. Therefore, it is not easy to obtain a space for mounting the electric connection box 80 and there is almost no extra room. Fastening/unfastening the clamping bolts 89 at such small area requires operation in poor posture and may deteriorate operatability thereof.

When a motor vehicle is scrapped, electric wires and automotive components are necessarily removed from a body panel 87 for recycling. In a structure of installation by using a clamping bolt 89 and a nut 88, the clamping bolt 89 being fastened tightly once cannot be removed easily at insufficient working area to hinder in recycling.

On the other hand, the main body 81 and the cover 85 of the electric connection box 80 may be formed with synthetic resin by injection molding. Therefore, displacements of position between the bolt insertion openings 84a of the mounting portions 84 and nuts 88 may be caused by expansion, shrinkage, warpage or deformation after injection molding. When displacement of position exist, the electric connection box 80 may not be fixed on the body panel 87 in case. To prevent displacement of position, controlling accuracy of dimension about the electric connection box 80 by molding may be required so that extra operation is required and productivity is deteriorated.

When displacement of position between the bolt insertion openings 84a and nuts 88 by deformation or the like exists, if the electric connection box 80 is mounted forcibly on the body panel 87 to deform the electric connection box 80, the electric connection box 80 may be cracked on a wall or damaged. When the electric connection box 80 is deformed, sealing effect between the main body 81 and the cover 85 is deteriorated so that water may penetrate into the electric connection box 80 through a gap.

To overcome the above drawback of prior art, one object of this invention is to provide a structure of installation which can easily mount a device on a body panel and dismount the device from the body panel, and can fix the device securely, and can improve recyclability.

SUMMARY OF THE INVENTION

How to Attain the Object

In order to attain the objects, a structure of installation for installing automotive components on a body of motor vehicle includes a mounting portion provided on the automotive component, a supporting portion provided on the body of motor vehicle, and a magnet placed on either one of the mounting portion or supporting portion. The other of the mounting portion or supporting portion is made of a ferromagnetic material, and the mounting portion and the supporting portion are joined by magnetic force.

According to the structure mentioned above, the body panel and the automotive component are attracted mutually by magnetic force so that the automotive component can be mounted securely on the body panel by one operation. When dismounting the automotive component from the body panel, sliding the mounting portion of the automotive component along shearing plane by applying property of magnetic force which along shearing plane is weaker, the automotive component can be dismounted easily from the body.

The structure of installation mentioned above is characterized by that the magnet is mounted on the mounting portion, and the supporting portion is made of a ferromagnetic material.

According to the structure mentioned above, the mounting portion of the automotive component has a magnet so that the automotive component can be fixed on unrestricted position of the body panel by attracting magnetic force without paying attention to positioning accuracy of the mounting bracket to be inserted by clamping bolts.

Therefore, operatability of mounting automotive components is improved.

The structure of installation, mentioned above, further includes a slide portion provided on the mounting portion and a guide portion formed at the supporting portion for engaging slidingly with the slide portion.

According to the structure mentioned above, the slide portion is inserted into the guide portion and engaged slidingly with the guide portion. Therefore, the slide portion is positioned in a direction perpendicular to sliding direction so that the automotive component is fixed on the body panel without chattering motion.

The structure of installation mentioned above is further characterized by that the magnet is surrounded by a yoke made of a ferromagnetic material between the mounting portion and the magnet, and an end portion of the yoke performs as the sliding portion.

According to the structure mentioned above, the magnet is covered with the yoke so that the magnetic flux is concentrated by preventing surrounding magnetic flux leakage of the magnet and then magnetic flux density of the magnet is increased. Furthermore, the end portion of the yoke performs as the sliding portion so that the sliding portion is magnetized by magnetic induction of the magnet and then magnetic force at the mounting portion is enlarged.

The structure of installation mentioned above is further characterized by that the mounting portion and the yoke are joined together by integral molding or the like, and the yoke and the magnet are fixed together by means of press-fitting, adhesive or the like.

According to the structure mentioned above, the mounting portion and the yoke are formed integrally by insert molding or the like so that adhesion of contact surfaces between the mounting portion and the yoke is increased to prevent the yoke from removing from the mounting portion. Furthermore, the yoke and the magnet are fixed together by means of press-fitting or the like so that the magnet is prevented from falling out of the yoke.

The structure of installation mentioned above is further characterized by that a jig-pin inserting portion is formed between the mounting portion and the supporting portion, and a jig-pin is for removing the mounting portion from the supporting portion.

According to the structure mentioned above, the jig-pin inserting portion is formed so that automotive components can be dismounted easily from the body of motor vehicle by inserting the jig-pin into the jig-pin inserting portion and rising the jig-pin to remove the mounting portion from the supporting portion.

The structure of installation mentioned above is further characterized by that an abutting portion against the mounting portion is formed at an almost deep area of the guide portion.

According to the structure mentioned above, pushing the mounting portion into the supporting portion and sliding the mounting portion, the mounting portion abuts on the abutting portion located along a direction of sliding and the automotive component is positioned in a direction of sliding.

The structure of installation mentioned above is further characterized by that an abutting portion against the mounting portion is formed at an almost deep area of the guide portion, and a step portion for the mounting portion is formed at an entry area of the guide portion.

According to the structure mentioned above, the mounting portion abuts on the abutting portion located along a direction of sliding to be positioned in a direction of sliding and the mounting portion abuts on the step portion to be prevented from coming out in an opposite direction of sliding so that the mounting portion is positioned between the abutting portion and the step portion in both directions of sliding.

The structure of installation mentioned above is further characterized by that the supporting portion is made of sheet metal by means of folding and a slide space for inserting the mounting portion is formed between the metal sheet being folded.

According to the structure mentioned above, the supporting portion is made of sheet metal by folding and the mounting portion is inserted into the slide space between the metal sheet being folded and clamped by the sheet metal. Therefore, an automotive component is mounted securely on the body panel without chattering motion and prevented from falling out by vibration.

The structure of installation mentioned above is further characterized by that the magnet is a ferrite magnet, a rare-earth magnet, the other sintered magnet or a bonded magnet.

According to the structure mentioned above, when using the sintered magnet, magnetic flux density of the magnet is high and then a holding force is increased so that attracting magnetic force for preventing an automotive component from being removed from the body panel is maintained even if demagnetization is occurred by vibration or temperature change. When using a bonded magnet, vibration of a vehicle is absorbed by elasticity of the magnet so that stability of attracting force of the magnet is improved.

The structure of installation mentioned above is further characterized by that the magnet is a multipole magnet which is magnetized alternately with multiple magnetic poles.

According to the structure mentioned above, the magnet provided on the mounting portion is a multipole magnet and then outward magnetic flux leakage of the magnet is decreased and magnetic flux density of the magnet is increased. Therefore, the magnetic force is enlarged and an automotive component is prevented from falling out of a body panel.

The structure of installation mentioned above is further characterized by that the mounting portion is provided on a main body of an electric connecting box, or a mounting bracket or a protector of a wire harness of the electric connecting box.

According to the structure mentioned above, the electric connecting box or the protector is fixed on a body panel by magnetic force without using bolts and nuts. Therefore, mounting/dismounting an automotive component can be done easily and recyclability of automotive components is improved.

The above and other objects and features of this invention will become more apparent from the following description taken in conjunction with the accompanying drawings.

BRIEF DESCRIPTION OF THE DRAWINGS

FIG. 6 is a perspective view of the supporting portion of the body panel shown in FIG. 1;

DESCRIPTION OF THE PREFERRED EMBODIMENT

Figure 1:
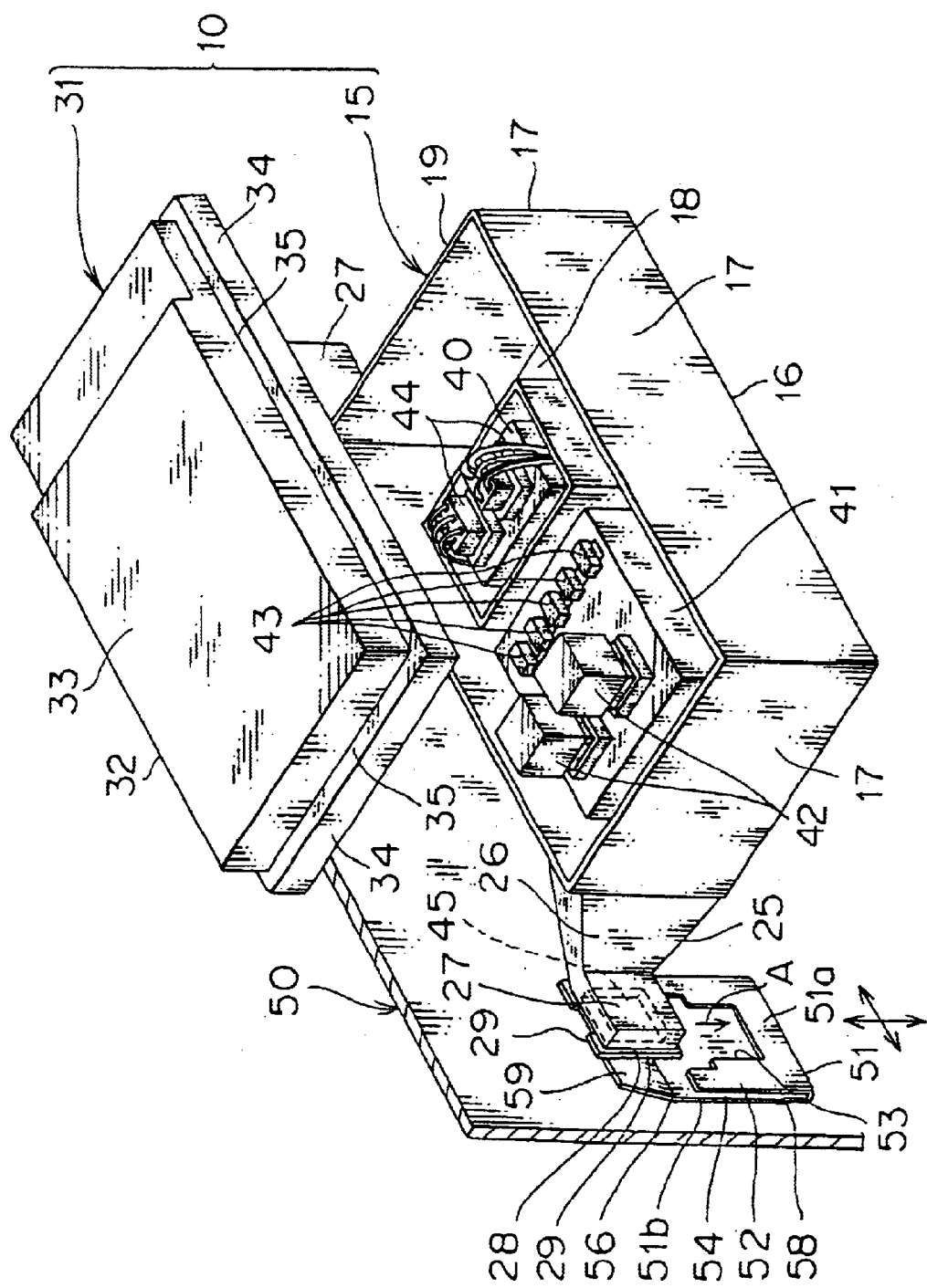
FIG. 1 is a perspective view of a structure of installation according to the first embodiment of this invention.

A structure of installation according to an embodiment of this invention will now be described with reference to drawings. FIG. 1 shows a first embodiment of a structure of installation according to this invention.

In FIG. 1, an electric connecting box 10 (automotive component) being mounted on a body panel 50 (body of motor vehicle) is shown. The electric connecting box 10 is fixed by attracting magnetic force on the body panel 50 of a not-shown vehicle or the like. The vehicle is not only a four-wheel motor vehicle but also a two-wheel motor vehicle, a tractor or the other agricultural vehicle, or a crane truck or the other construction vehicle. The body panel 50 is made of steel plate as a ferromagnetic material.

The electric connecting box includes junction blocks 40, 41 as main components for electrical connection, a main body 15 having an opening upward for receiving the junction blocks 40, 41, and a cover 31 having an opening downward for covering the opening of the main body 15. The electric connecting box 10 is disposed in an engine room or around an instrument panel of a motor vehicle, as a built-in automotive component for relaying electrical connection between various auxiliary devices.

The junction blocks 40, 41 are components for performing transmitting/receiving signals among electronic devices, such as meters, switches, lumps or the like, and power-supplying from a battery to a starter or alternator. The junction blocks 40, 41 include insulating baseboards made of synthetic resin, bus bars (not-shown) overlapping mutually on the insulation baseboards for forming conducting path, and functional components connecting with tab-shape terminals standing continuously from end portions and middle portions of the bas bars.

The bus bar is a conductive plate formed by means of punching electrical conductive sheet metal by a press machine. The functional components are a relay 42, a fuse 43, a connector 44, a fusible link (not shown) and a circuit breaker (not shown). The bus bars are overlapped on the insulating baseboard of synthetic resin to form a wiring board. The junction blocks 40, 41 are structured with the wiring boards and the functional components. The functional components, such as a relay 42 are not necessarily connected with the wiring boards and branch circuits for various auxiliary devices can be formed with only wiring boards.

The cover 31 of synthetic resin covers the opening of the main body 15 to prevent water, steam or dust from penetrating inward. The cover 31 is formed accurately by injection molding. An outer wall 32 of the cover 31 includes a top wall 33 and side wall 34 continuous to periphery of the top wall 33. An inner wall surface of the side wall 34 overlaps outer wall surface of an opening edge portion 19 of the main body 15, and a frame-shape edge portion 35 perpendicularly continuous to the inner wall surface of the side wall 34 abuts on the opening edge portion 19 of the main body 35 to enclose tightly the opening of the main body 15. A packing may be clamped between the frame-shape edge portion 35 and the opening edge portion 19 abutting mutually to enhance water resistance of the electric connecting box 10 even more.

The main body 15 of synthetic resin is a rectangular box shape deep case and is formed by injection molding similarly as the cover 31. An outer wall 16 of the main body 15 includes a side wall 17 and a bottom wall 18 perpendicularly continuous to periphery of the side wall 17. In an inner space surrounded by the side wall 17 and the bottom wall 18, the relay 42, the fuse 43 and the junction blocks 40, 41 connecting with the connector 44 are received. The junction blocks 40, 41 shown in the figure are divided in two for respective functional components. Junction block formed integrally can be used also.

The main body 15 of synthetic resin is provided at both sides of one side wall 17 with a pair of mounting brackets 25 (shown only one of the pair) for fixing the main body 15 on the body panel 50. Owing to providing the mounting brackets 25 projecting from the outer wall 16 on the main body 15, the electric connecting box 10 can be mounted on the body panel 50 even if the body panel 50 is not flat surface but curved surface. Therefore, flexibility of mounting the electric connecting box 50 is improved.

The mounting bracket 25 includes a leg portion 26 continuous to the side wall 17 and a mounting portion 27 continuous to the leg portion 26. Whole shape of the mounting bracket 25 is not restricted to L-shape or reversed L-shape. The leg portion 26 is formed into thick and wide at base thereof and gradually thinner and narrower in proportion to nearing a top end thereof. The mounting portion 27 is formed being bent continuously to the top end.

The mounting portion 27 is a fixing portion corresponding to a supporting portion 51 of the body panel 50. The mounting portion 27 is formed into rectangular solid shape and a magnet 45 is filled exposing a mount surface outwardly inside the mounting portion 27. An Alnico magnet (MK steel), a ferrite magnet, a rare-earth magnet, a bond magnet or the other various magnet can be used as the magnet 45, and a sintered magnet which has high magnetic flux density and large coercive force is preferable to be applied.

In stead of the magnet 45 being sintered solidly by powder metallurgy process, a multipole magnet being magnetized alternately with multiple magnetic poles (not shown) can be applied. Using the multipole magnet, outward magnetic flux leakage of the magnet is decreased and magnetic flux density of the magnet is increased so that the magnetic force is enlarged advantageously.

The whole shape of the mounting portion 27 is not restricted to a rectangular solid, but can be a disk shape or a polygonal shape or the other shape. Method of fixing the magnet 45 into the mounting portion 27 is not restricted to filling by press fitting, but can be applied by molding integrally with the mounting portion 27 or adhering with adhesive of synthetic resin.

Figure 2:
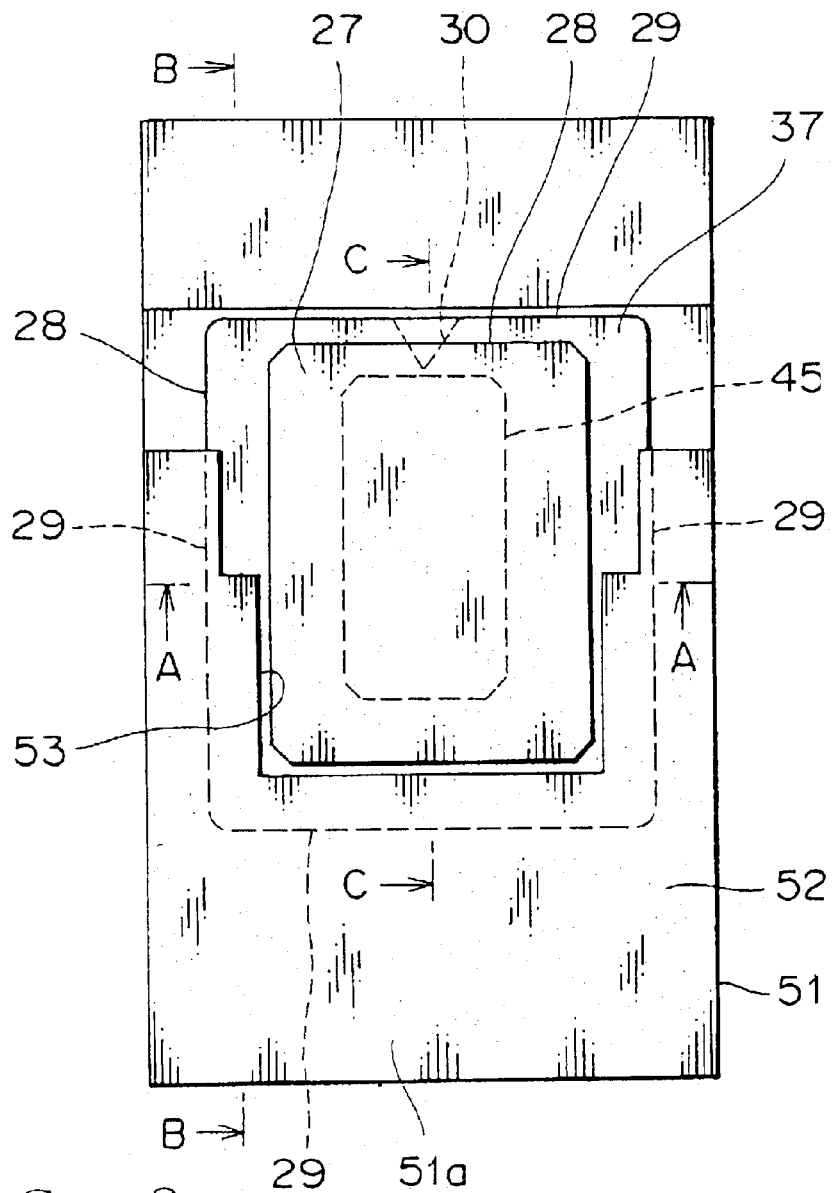
FIG. 2 is a plan view, showing a condition of fitting a mounting portion of an automotive component in FIG. 1 and a supporting portion of a body panel.
Figure 3:
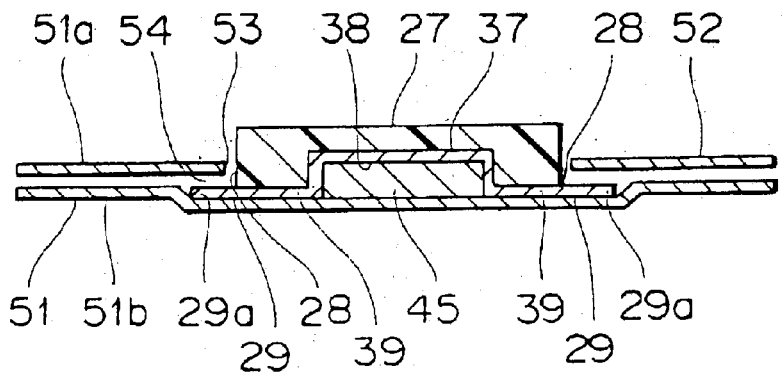
FIG. 3 is a sectional view of the plan view in FIG. 2, taking along the line A—A.

A ring-shape flange 29 (slide portion), as shown in FIG. 2, is formed at a round edge 28 of the mounting portion 27. The flange 29 is not necessarily formed around the mounting portion 27, and may be enough to engage slidingly with the supporting portion 51 of the body panel 50 (in FIG. 1). Therefore, at least a pair of flanges 29 may formed correspondingly to each other in a direction perpendicular to a direction of sliding A (in FIG. 1). As this embodiment, the flange 29 can be provided at front and rear side in the direction of sliding A. The flange 29 at front side in the direction of sliding A abuts on an abutting portion 58 (FIG. 4) provided at a deep side 57 of the supporting portion 51 to position the electric connecting box in the direction of sliding A. The flange 29 at rear side in the direction of sliding A abuts on a step portion 56 (FIG. 4) at an entry side 55 of the supporting portion 50 to prevent the mounting portion 27 from being extracted rearwardly from the supporting portion 51.

The flange 29 can be formed integrally with the mounting portion 27 of synthetic resin. The flange 29 can also be formed with magnetic stainless steel plate (for example SUS340) or the other ferromagnetic material. In such a case, a yoke 37 of thin plate may be sandwiched between the mounting portion 27 and the magnet 45, and an edge portion 39 of the yoke 37 may be extended as flange shape at the round edge 28 of the mounting portion 27.

The mounting portion 27 and the yoke 37 are molded integrally by insert molding, and the magnet 45 is fitted by press into a recess 38 of the yoke 37. In other words, the yoke 37 is fixed like a sandwich as an inner member between the mounting portion 27 and the magnet 45. The magnet 45 and the yoke 37 can also be fixed with an adhesive.

According to a structure mentioned above, the magnet 45 is surrounded with the yoke 37 of a ferromagnetic material so that outward magnetic flux leakage of the magnet is decreased and magnetic flux density of the magnet is increased. On the other hand, the yoke 37 is magnetized by magnetic induction of the magnet 45 and an attractive magnetic force is increased. An end surface 29a of the flange 29 is a mounting surface corresponding to the supporting portion 51 so that attractive force of the mounting portion 27 and the supporting portion 51 is increased. Therefore, the electric connecting box 10 can be fixed securely on the body panel 50.

When the end surface 29a of the flange 29 performs as a mounting surface, the exposed surface of the magnet 45 is not necessarily formed to be in the same plane of the end surface 29a of the flange 29, and is formed preferably to be dented from the end surface 29a of the flange 29. According to denting as mentioned above, a contact area for the supporting portion 51 (FIG. 1) is reduced but oppositely attractive force of the magnet 45 is increased. Depending on Coulomb law, attracting force of the magnet 45 is in proportion to product of magnetic charges of both magnetic poles, but is not related with contact area. Furthermore, the magnetic flux is concentrated at the yoke 37 and then effective magnetic energy is increased.

Figure 4:
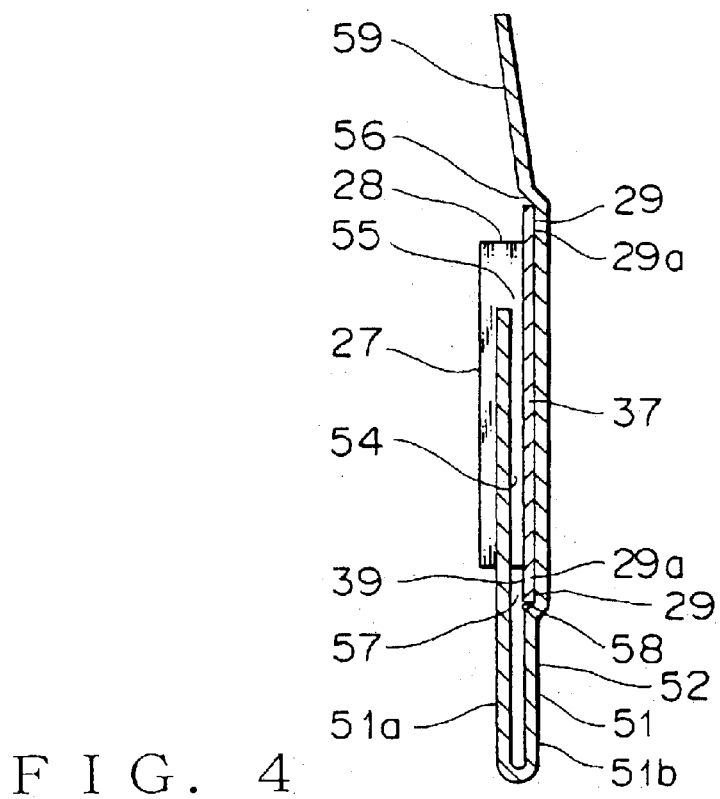
FIG. 4 is a sectional view of the plan view in FIG. 2, taking along the line B—B.
Figure 5:
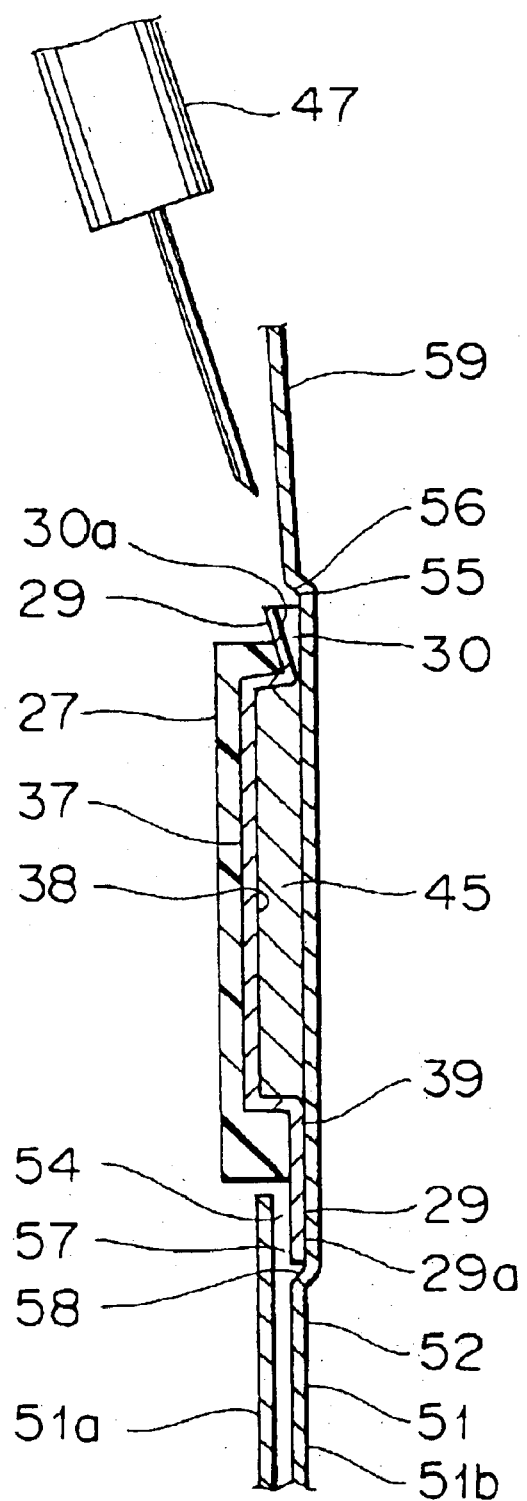
FIG. 5 is a sectional view of the plan view in FIG. 2, taking along the line C—C for explaining a condition of inserting a jig-pin.
Figure 8:
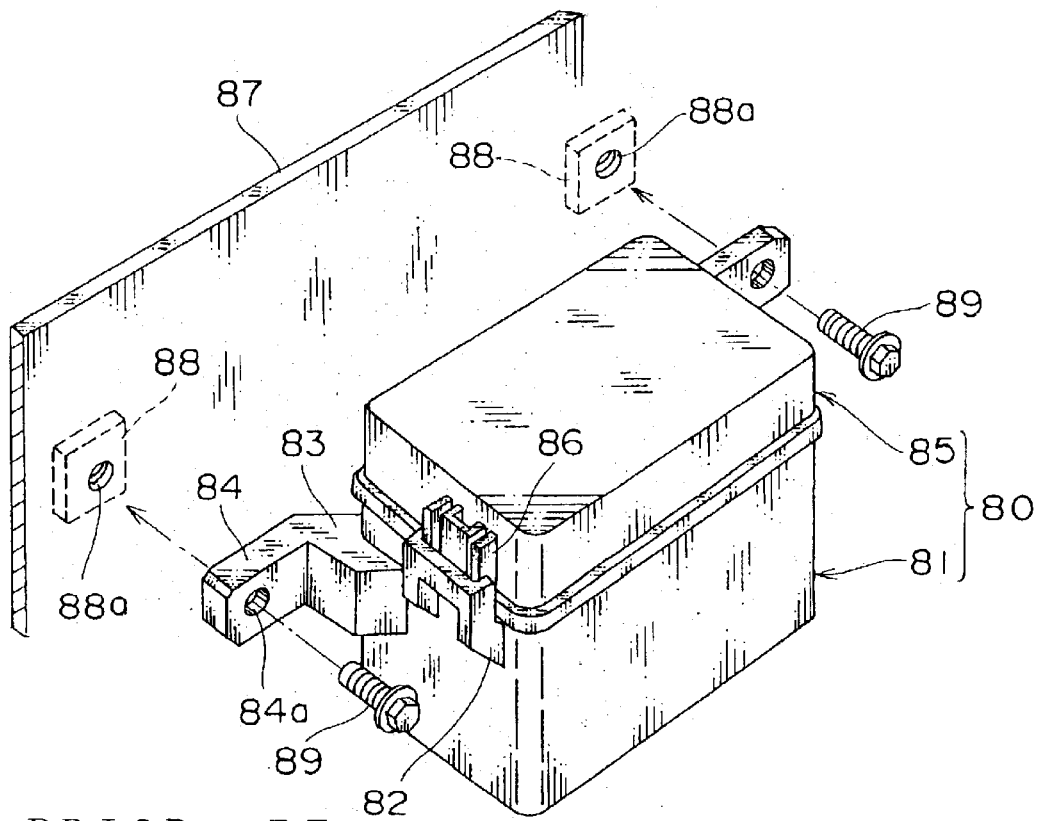
FIG. 8 is a perspective view of one example of a usual structure of installation.

The flange 29 of the yoke 37, as shown in FIG. 5, is formed at the entry side 55 of a slide space 54 (FIG. 4) with a jig-pin inserting portion 30 for separating the mounting portion 27 and the supporting portion 51 those are fixed attractingly by magnetic force. The jig-pin inserting portion 30 is formed into a groove having a tapered surface 30a. By inserting a jig-pin 47 into the jig-pin inserting portion 30 and rising the jig-pin 47 without scratching on the mounting portion 27 with the jig-pin 47, the electric connecting box 10 (FIG. 1) being fixed by magnetic force can be dismounted easily from the body panel 50.

The supporting portion 51 of the body panel 50 (FIG. 1), as shown in FIG. 6, is made of steel plate of a ferromagnetic material and is a different member from the body panel 50. Therefore, the supporting portion 51 can be fixed freely at any position of the body panel 50 by welding or the like. The material of the supporting portion 51 is not restricted to steel plate, but can be applied by magnetic stainless steel mentioned above and may be selected by considering weldability to the body panel 50 and attractive force between the magnet 45.

The supporting portion 51 is made by means of folding a punched piece with a predetermined form by pressing steel plate to be turned back. A rear surface 51b of the supporting portion 51 is a surface for welding to the body panel 50. A surface 51a is formed with a slot 53 (guide portion) for guiding slidingly the supporting portion 51. The slide space 54 is made between two metal plates being folded.

As is shown in FIG. 4, the sliding portion of the yoke 37 has a thickness that is less than the thickness of the slide space 54 into which the slide portion slides.

The step portion 56, for preventing the mounting portion 27 from being extracted rearwardly in an opposite direction of sliding A by abutting the flange 29 at rear side in the direction of sliding A of the mounting portion 27 on the step portion 56, is formed at the entry side 55 of the slide space 54. The abutting portion 58, on which the flange 29 at front side in the direction of sliding A abuts, is provided at the deep side 57 of the slide space 54 as shown in FIG. 5. Thereby, the mounting portion 27 is positioned between the step portion 56 and the abutting portion 58 in both directions of sliding A. The area between the step portion 56 and the abutting portion 58 thus forms a recess of the slide portion. Positioning the mounting portion 27 in the direction perpendicular to the direction of sliding A is done by engaging the mounting portion 27 slidingly with the slot 53, as mentioned above. Any of the step portion 56 and the abutting portion 58 may be provided for positioning.

The supporting portion 51 is formed with a slant plate portion 59 continuous to the step portion 56. Base end of the slant plate portion 59 is continuous to the step portion 56 and free end thereof is slanted to apart from the body panel 50 (FIG. 1). The slant plate portion 59 can be bent in a direction of thickness of the body panel 50 about the base end thereof as a fulcrum. The mounting portion 27 is inserted slidingly while bending the slant plate portion 59 toward the body panel 50 and inserted deeper to be guided by the slot 53 of the supporting portion 51. When the flange 29 abuts on the abutting portion 58 of the slide space 54, the mounting portion 27 is received completely in the slide space 54 and the slant plate portion 59 returns elastically.

Figure 7:
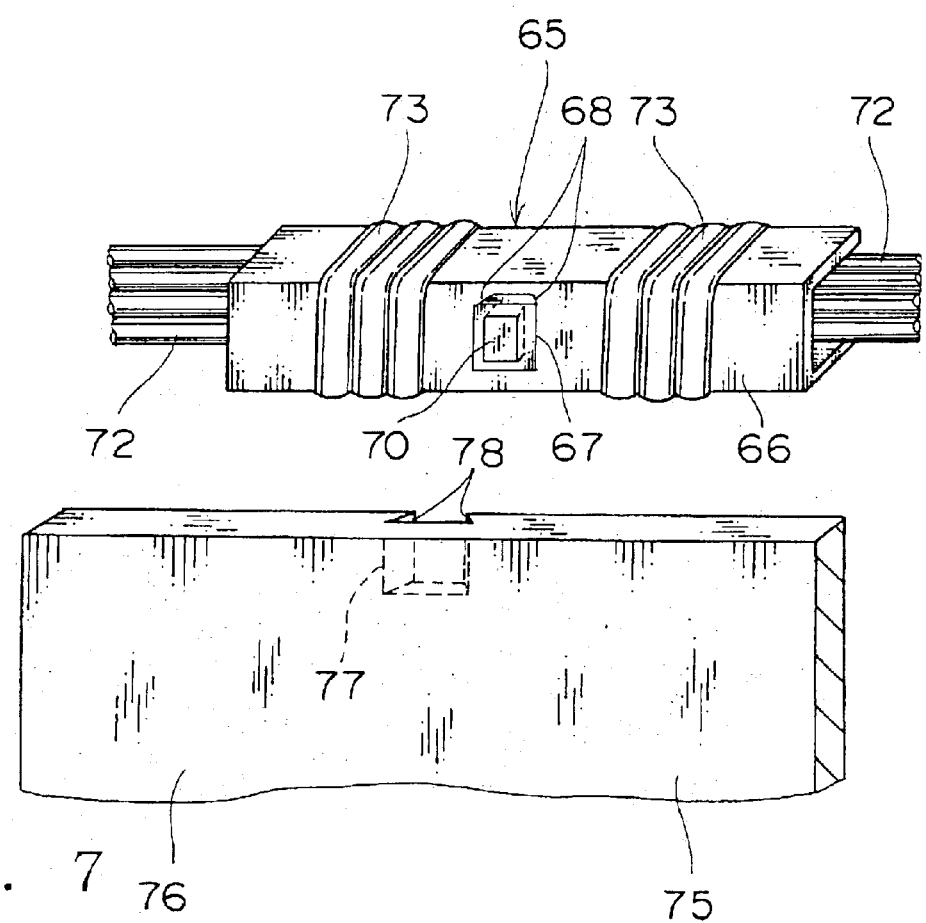
FIG. 7 is a perspective view of a structure of installation according to the second embodiment of this invention.

A structure of installation according to a second embodiment of this invention will now be described. The second embodiment of this invention is a structure of installation regarding a protector 65 (automotive component) for a wire harness. The protector 65 shown in FIG. 7 has a rectangular tube shape being opened at both side ends lengthwise and at one end for receiving and protecting a plurality of electric wires 72 or a not-shown wire harness formed by bundled electric wires inside thereof.

To open the both side ends of the protector 65, the electric wires 72 can be protected at middle portion thereof. To open one end of the protector 65, the electric wires 72 can be clamped from a direction perpendicular to an axis of the electric wires 72. After clamping the electric wires 72, an insulation tape 73 is winded around the protector 65 at a predetermined position for fixing the electric wires 72 in the protector 65.

The protector 65 is placed in a wiring path of the electric wires 72, and mounted on a body panel 75. Generally (not shown) a protector is provided with a mounting bracket having an inserting hole for a bolt, and a body panel is provided with an opening corresponding to the inserting hole for a bolt. Then, the protector is fixed on the body panel by tightening a locking bolt and a nut. According to this embodiment, the protector 65 is fixed on the body panel 75 by attractive force of a magnet 70 and a ferromagnetic material without a locking bolt and a nut. Therefore, a number of parts is reduced and the protector can be fixed on the body panel by one operation without a trouble.

A mounting portion 67 projecting from a surface of a side wall 66 is provided at the side wall 66 of one of side walls of the protector 65. The mounting portion 67 has taper portions 68 (slide portions) at both sides thereof. A magnet 70 is fitted in the central area of the mounting portion 65. The magnet 70 is fixed in the mounting portion 65 similarly as the first embodiment, such as by press-fitting or the like.

The magnet 70 is applied by a permanent magnet such as a sintered magnet like a ferrite magnet and a rare-earth magnet, or a bond magnet. A bond magnet is formed with a mixed material of a magnetic powder and a binder such as a rubber or a plastic material. Owing to a binder, magnetic flux density and large coercive force thereof are smaller than that of a sintered magnet. However, mixing a magnetic powder like a nitride of samarium and iron, the bond magnet can be used as a strong magnet. A bond magnet is preferable to use at a position vibrated in a motor vehicle because of high shock resistance and high resistance against vibration thereof.

The body panel 75 is made of a ferromagnetic material such as steel plate or the like. The body panel 75 is provided with a supporting portion 77 with dovetail shape engaging with the mounting portion 67 of the protector 65. Groove walls 78 (guide portions) of the supporting portion 77 are slide surfaces corresponding to the taper portions 68. Shape of the supporting portion 77 is not restricted to dovetail shape and may be any shape engaging slidingly with the mounting portion 67 of the protector 65.

Operation of the structure mentioned above is described herein. Placing the protector 65 above the body panel 75, positioning the mounting portion 67 correspondingly to the supporting portion 77, the mounting portion 67 is inserted into the supporting portion 77. Thereby, the mounting portion 67 slides to be guided by the supporting portion 77, and the magnet 70 and the ferromagnetic material are fixed attractively by magnetic force at a position where the mounting portion 67 slides into the deepest area.

In the first embodiment and the second embodiment, the magnet 45, 79 can be provided at the body panel 50, 75 instead of the automotive component 10, 65 and the ferromagnetic material can be provided at the automotive component 10, 65.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. A structure of installation for installing automotive components on a body of motor vehicle comprising:
    a mounting portion provided on the automotive component;
    a supporting portion provided on the body of motor vehicle; and
    a magnet placed on either one of the mounting portion or supporting portion;
    wherein the other of the mounting portion or supporting portion is made of a ferromagnetic material, wherein the mounting portion and the supporting portion are joined by magnetic force;
    wherein the magnet is mounted on the mounting portion, wherein the supporting portion is made of the ferromagnetic material; and
    further comprising:
        a slide portion provided on the mounting portion; and
        a guide portion formed at the supporting portion for engaging slidingly with the slide portion.

2. The structure of installation according to claim 1, wherein the supporting portion is made of sheet metal by folding, wherein a slide space for inserting the mounting portion is formed between the metal sheet being folded.

3. The structure of installation according to claim 1, wherein the magnet is a ferrite magnet, a rare-earth magnet, the other sintered magnet or a bonded magnet.

4. The structure of installation according to claim 1, wherein the magnet is a multipole magnet which is magnetized alternately with multiple magnetic poles.

5. The structure of installation according to claim 1, wherein the mounting portion is provided on a main body or a mounting bracket of an electric connecting box, or a protector of a wire harness.

6. The structure of installation according to claim 1, wherein the slide portion comprises a recess, such that the guide portion is fitted into the recess as it slidingly engages with the slide portion.

7. The structure of installation according to claim 1, wherein the slide portion has a slide portion thickness that is less than a slide space thickness of a slide space of the guide portion, into which the slide portion slides.

8. A structure of installation for installing automotive components on a body of motor vehicle comprising:
    a mounting portion provided on the automotive component;
    a supporting portion provided on the body of motor vehicle; and
    a magnet placed on either one of the mounting portion or supporting portion;
    wherein the other of the mounting portion or supporting portion is made of a ferromagnetic material, wherein the mounting portion and the supporting portion are joined by magnetic force;
    further comprising:
        a slide portion provided on the mounting portion; and
        a guide portion formed at the supporting portion for engaging slidingly with the slide portion;
        wherein the magnet is surrounded by a yoke made of the ferromagnetic material between the mounting portion and the magnet, wherein an end portion of the yoke performs as the sliding portion.

9. The structure of installation according to claim 8, wherein the mounting portion and the yoke are joined together by integral molding or the like, wherein the yoke and the magnet are fixed together by press-fitting, adhesive or the like.

10. The structure of installation according to claim 8, wherein a jig-pin inserting portion is formed between the mounting portion and the supporting portion, a jig-pin for removing the mounting portion from the supporting portion.

* * * * *